United States Patent
van Kuilenburg (10) Patent No.: US 12,018,542 B2
(45) Date of Patent: Jun. 25, 2024

(54) SEAL ELEMENTS FOR ANNULAR CONTROL DEVICES

(71) Applicant: Noble Rig Holdings Limited, Sugar Land, TX (US)

(72) Inventor: Robert van Kuilenburg, Sugar Land, TX (US)

(73) Assignee: Noble Rig Holdings Limited, Sugar Land, TX (US)

( * ) Notice: Subject to any disclaimer, the term of this patent is extended or adjusted under 35 U.S.C. 154(b) by 0 days.

(21) Appl. No.: 17/890,195

(22) Filed: Aug. 17, 2022

(65) Prior Publication Data

US 2022/0389785 A1   Dec. 8, 2022

Related U.S. Application Data

(63) Continuation of application No. PCT/US2021/018804, filed on Feb. 19, 2021.

(60) Provisional application No. 62/978,589, filed on Feb. 19, 2020.

(51) Int. Cl.
*E21B 33/08* (2006.01)
*E21B 47/07* (2012.01)

(52) U.S. Cl.
CPC ............ *E21B 33/085* (2013.01); *E21B 47/07* (2020.05)

(58) Field of Classification Search
CPC .............................. E21B 33/085; E21B 33/06
See application file for complete search history.

(56) References Cited

U.S. PATENT DOCUMENTS

| | | | |
|---|---|---|---|
| 3,472,518 A * | 10/1969 | Harlan | F16J 15/44 |
| | | | 415/230 |
| 5,549,156 A | 8/1996 | Borden | |
| 6,932,350 B1 | 8/2005 | Husted | |
| 7,270,890 B2 | 9/2007 | Sabol et al. | |
| 10,190,378 B2 | 1/2019 | Alajbegovic et al. | |
| 10,240,422 B2 | 3/2019 | Fripp et al. | |
| 2009/0057020 A1* | 3/2009 | Williams | E21B 33/085 |
| | | | 175/195 |
| 2011/0036638 A1* | 2/2011 | Sokol | E21B 21/085 |
| | | | 175/325.3 |

(Continued)

FOREIGN PATENT DOCUMENTS

| | | |
|---|---|---|
| EA | 17043 B1 | 9/2012 |
| RU | 2347060 C1 | 2/2009 |

(Continued)

OTHER PUBLICATIONS

Schlumberger Oilfield Glossary—Annular Space—https://glossary.slb.com/en/terms/a/annular_space (Year: 2023).*

(Continued)

*Primary Examiner* — David Carroll
(74) *Attorney, Agent, or Firm* — Richard A. Fagin (57) ABSTRACT

A seal element for an annular control device includes an elastomer seal sleeve having an annular opening therein and arranged to be radially compressed to contact an exterior of a pipe disposed within the elastomer seal element. The elastomer seal sleeve comprises at least one of a wear resistant material disposed on an interior surface of the annular opening and a lubricant channel on the interior surface.

11 Claims, 8 Drawing Sheets

(56) References Cited

U.S. PATENT DOCUMENTS

| | | | |
|---|---|---|---|
| 2011/0315404 A1* | 12/2011 | Bailey | E21B 33/085 166/387 |
| 2014/0027129 A1* | 1/2014 | Hannegan | E21B 33/085 166/387 |
| 2015/0337599 A1* | 11/2015 | Bullock | E21B 47/007 702/9 |
| 2017/0089164 A1 | 3/2017 | Hughes | |

FOREIGN PATENT DOCUMENTS

| | | |
|---|---|---|
| RU | 2540172 C2 | 2/2015 |
| WO | 2014006149 A2 | 1/2014 |
| WO | 2019118394 A1 | 6/2019 |

OTHER PUBLICATIONS

Schlumberger Oilfield Glossary—Annulus https://glossary.slb.com/en/terms/a/annulus (Year: 2023).*
International Search Report and Written Opinion dated Jun. 30, 2021, for International Application No. PCT/US21/18804.
Office Action dated Nov. 15, 2021, U.S. Appl. No. 17/180,349.
Final Office Action and translation dated Apr. 6, 2023, for Russian Application No. 2022123643/03(050770) and translation.
Russian Search Report dated Apr. 6, 2023, for Russian Application No. 2022123643/03(050770).
Partial supplementary European search report dated Feb. 29, 2024, for European Patent Application No. 21757827.7.

* cited by examiner

DP longitudinal speed

SEAL ELEMENTS FOR ANNULAR CONTROL DEVICES

CROSS REFERENCE TO RELATED APPLICATIONS

Continuation of International Application No. PCT/US2021/018804 filed Feb. 19, 2021. Priority is claimed from U.S. Provisional Application No. 62/978,589 filed on Feb. 19, 2020. Each of the foregoing applications is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of rotatable annular sealing devices used in well drilling. More specifically, the disclosure relates to rotatable annular sealing devices used during drilling operations for managing pressure in a well annulus, that is, the space between drill pipe used to move a drill bit, and the wall of the well.

Managed pressure drilling techniques are used to maintain fluid pressure in the annulus (the space between open formations and the drilling tool string) of a drilling well within a range between the exposed formation fluid ("pore") pressure and the exposed formation mechanical failure ("fracture") pressure. This pressure range or "window" is sometimes referred to as the "drilling margin" and represents the pressure range within which little or no formation fluid flows into the well and little or no drilling fluid is lost to the formation itself. While drilling fluids are typically weighted (made more dense than plain water to exert higher fluid pressure), other factors contribute to the pressure acting on the exposed formations in the well. Such factors include fluid friction, drilling tool rotation, and applied surface back pressure ("ASBP"). Failure to precisely control these factors can result in a well control event, including the unintentional influx of formation fluids into the wellbore or the loss of expensive drilling fluids to the exposed formations. Consequently, deviation from the drilling margin can substantially increase drilling costs and expose the drilling rig and personnel to dangerous conditions including, potentially, a blowout.

Managed pressure drilling ("MPD") systems seal the annulus between the drilling tool string and the wellbore wall for all in-well operations, including rotating the drill string and stripping. Sealing the annulus improves the ability of the drilling rig to manage well annulus pressure. With the wellbore annulus sealed, MPD systems allow for the application of surface back pressure (ASBP) to the well. The drilling rig may apply additional surface back pressure to increase the well fluid pressure acting on the formation or may drill ahead with back pressure to allow for rapid well pressure reduction to mitigate fluid losses. During connections (times during which segments are added to or removed from the drill string), surface back pressure may be increased to offset the loss of circulating friction pressure that occurs as the rig mud pumps are stopped. Typically, applied back pressure is increased during connections by an amount proportional to the difference between the equivalent circulating density ("ECD"), that is the effective density of the drilling fluid when it is flowing in the well, and the equivalent static density ("ESD"), that is, the fluid pressure when the drilling fluid is not moving.

MPD systems may allow the drilling rig to more quickly detect warning signs of a potentially hazardous situation in a well. With the annulus closed, all returning fluids from the well may be measured with greater accuracy, enabling faster fluid influx and loss detection than is available using conventional drilling techniques wherein the annulus remains open. Faster detection, and consequent faster response time, may result, in the case of a fluid influx event, in a smaller influx volume because the duration of the underbalanced condition can be reduced. Smaller influxes are typically easier to circulate out of the well because there is typically less gas or light annular fluids that place less stress on weaker formations. In the event an unintentional influx is introduced into the well, the MPD system may be used to apply surface back pressure to the well to stop the influx before it becomes necessary to operate the blowout preventer ("BOP"). By avoiding BOP operation, it is possible to eliminate drawdown pressure acting on the formation following mud pump shutdown and closure of the BOP, and further reduce the influx volume.

Conventional MPD systems include an annular sealing system, a drill string isolation tool, and a flow spool, or equivalents thereof, that actively manage wellbore pressure during drilling and other operations. The annular sealing system may include a rotating control device ("RCD"), an active control device ("ACD"), or other type of annular seal that is configured to close the annulus surrounding the drill string while it rotates. The annulus is thus encapsulated such that it is not exposed to the atmosphere. The drill string isolation tool is disposed directly below the annular sealing system and includes an annular packer that encapsulates the well and maintains annular pressure when drill string rotation has stopped, as well as when the annular sealing system, or components thereof, are being installed, serviced, removed, or otherwise disengaged. The flow spool is disposed directly below the drill string isolation tool and, as part of a pressurized fluid return system, diverts fluids from below the annular seal to the surface. The flow spool is in fluid communication with a choke manifold, typically disposed on a platform of the drilling rig. The choke manifold is in fluid communication with a mud-gas separator, shakers, or other fluids processing system. The pressure tight seal on the annulus allows for the precise control of wellbore pressure by actively controlling choke settings (aperture or opening) of the choke manifold and the corresponding application of surface back pressure. MPD systems are increasingly being used in deep water and ultra-deep water applications where the precise management of wellbore pressure is required for technical, environmental, and/or safety reasons.

International Application Publication No. WO 2019/118394 filed by Johnson et al. discloses a method of ACD/RCD seal condition monitoring. The disclosed method may determine the state of the annular seal, the state of one or more sealing elements, take actions to maintain the annular seal as one or more sealing elements transition from new to worn, and provide advance notice of the impending failure of one or more sealing elements so as to avoid a catastrophic annular seal failure while a marine riser is pressurized. Operations may be conducted proactively rather than reactively, and one or more sealing elements may be replaced well in advance of failure, but potentially later than an unmonitored maintenance schedule would dictate. The one or more failing sealing elements may be proactively replaced without depressurizing the marine riser, prior to seal failure or replacement may be planned well in advance and coordinated with other rig operations to improve efficiency and maintain the safety of the drilling rig and personnel.

With reference to the WO '394 publication, FIG. 5A therein shows a partial cross-sectional view of an ACD-type annular sealing system (e.g., 300 of FIG. 3 in the '394 publication) with dual seal sleeve 200 and drill pipe 330 disposed therein, where upper annular packer system 310a and lower annular packer system 310b are in a disengaged state. As noted above, the ACD-type annular sealing system typically includes redundant sealing elements 100a and 100b that are engaged or disengaged at the same time. When upper annular packer system 310a and lower annular packer system 310b are disengaged, upper annular packer 420a and lower annular packer 420b are disengaged and upper sealing element 100a and lower sealing element 100b are relaxed such that the annulus surrounding drill pipe 330 is unsealed.

Continuing, FIG. 5B of the WO '394 publication shows a partial cross-sectional view of the ACD-type annular sealing system with a dual seal sleeve 200 and drill pipe 330 disposed therein, where an upper annular packer system 310a and a lower annular packer system 310b are in an engaged state. As noted above, while redundant sealing elements 100a and 100b are typically engaged or disengaged at the same time, the upper annular packer system 310a and the lower annular packer system 310b may be operated independently of one another. When the upper annular packer system 310a is engaged, a hydraulically actuated piston 510a travels, causing the elastomer or rubber portion of the upper annular packer 420a to travel within an upper radiused housing 410a. When sufficiently engaged, the upper annular packer 420a causes the upper sealing element 100a to make contact, and form an interference fit with the drill pipe 330. Specifically, the upper seal insert 120a and upper buffer material 130a make contact and form an interference fit with a circumference of the drill pipe 330. Similarly, when the lower annular packer system 310b is engaged, a hydraulically actuated piston 510b travels causing the elastomer or rubber portion of the lower annular packer 420b to travel within the lower radiused housing 410b. When sufficiently engaged, the lower annular packer 420b causes the lower sealing element 100b to make contact, and form an interference fit with the drill pipe 330. Specifically, the lower seal insert 120b and the lower buffer material 130b make contact and form an interference fit with the circumference of the drill pipe 330.

Continuing, FIG. 5C of the WO '394 publication shows a partial cross-sectional view of the ACD-type annular sealing system with a dual seal sleeve 200 and the drill pipe 330 disposed therein, where the upper annular packer system 310a and the lower annular packer system 310b are in an engaged state and lubrication is injected into a lubrication chamber 550 via a lubrication injection port 320. When drilling ahead, the lubricant pressure in the lubrication chamber 550 may be maintained just above wellbore pressure by injecting lubrication fluid 530 that may be comprised of, for example, active drilling mud, into the cavity (not independently illustrated). The hydraulic closing pressures (not shown) of the upper annular packer system 310a and the lower annular packer system 310b of the ACD-type annular sealing system that are configured to engage the upper sealing element 100a and the lower sealing element 100b, respectively, may be adjusted independently to maintain the desired lubricant pressure within the lubrication chamber 550. The lubrication fluid 530 cools and lubricates the upper sealing element 100a and the lower sealing element 100b. Because of the rotation of the drill pipe 330 and the imperfect seal formed by the sealing elements 100a and 100b, the injected lubrication fluid 530 that lubricates lower sealing element 100b may eventually work its way below the lower sealing element 100b and join the return flow of fluids (not shown) to the choke manifold (not shown) disposed on the surface (not shown). The lubrication fluid 530 that lubricates the upper sealing element 100a may be collected in the drilling fluid trip tank (not shown). In one or more embodiments of the present invention, the hydraulic closing pressures (not shown) of the upper annular packer system 310a and the lower annular packer system 310b of the ACD-type annular sealing system may be actively and independently adjusted to maintain the annular seal (not independently illustrated).

The foregoing is intended to illustrate the importance of and typical operation of example annular seals in an MPD system, and is not intended to limit the scope of the present disclosure in any way.

In view of the importance of MPD systems, and the essential aspect of ACDs/RCDs in making MPD systems work, there is a need for improved seal elements in such devices.

SUMMARY

One aspect of the present disclosure is a seal element for an annular control device. The seal element includes an elastomer seal sleeve having an annular opening therein and arranged to be radially compressed to contact an exterior of a pipe disposed within the elastomer seal element. The elastomer seal sleeve comprises at least one of a wear resistant material disposed on an interior surface of the annular opening and a lubricant channel on the interior surface.

In some embodiments, the wear resistant material comprises longitudinally oriented wear bars.

In some embodiments, the wear resistant material comprises at least one circumferentially oriented wear ring.

In some embodiments, the lubricant channel comprises recesses forming a fluid bearing.

In some embodiments, the lubricant channel comprises at least one helical groove.

In some embodiments, the lubricant channel comprises an asymmetrical cross section.

In some embodiments, the cross section comprises a taper on one side of the cross section.

In some embodiments, the interior surface comprises a sawtooth shape.

Some embodiments further comprise a wiper seal disposed on at least one longitudinal end of the seal sleeve.

In some embodiments, the interior surface is shaped in the form of a labyrinth seal arranged to distribute a differential pressure across the seal element through a plurality of labyrinth chambers.

In some embodiments, a pitch of the lubricant channel is selected to provide maximized fluid lift with respect to effective linear speed between the exterior surface of the pipe and the interior surface of the annular opening.

In some embodiments, the elastomer seal material comprises at least one sensor.

In some embodiments, the at least one sensor comprises a resistance sensor formed from material chosen to wear at a rate related to wear of the elastomer seal material.

In some embodiments, the at least one sensor comprises a temperature sensor.

Other aspects and possible advantages will be apparent from the description and claims that follow.

BRIEF DESCRIPTION OF THE DRAWINGS

FIGS. 7EA and 7EB illustrate effects of angle of net effective speed and helix angle on the speed of motion between drill pipe and seal material.

DETAILED DESCRIPTION

Figure 1:
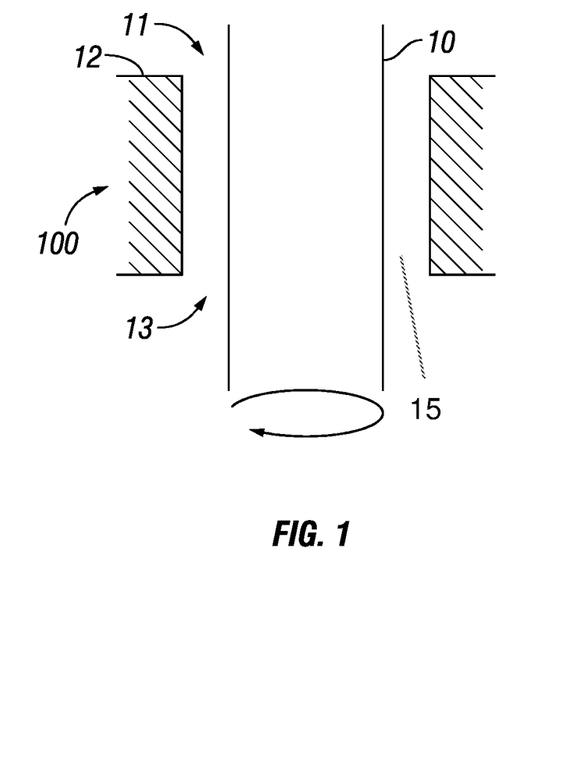
FIG. 1 shows components an ACD seal element and how such seal element can close to perform its intended function.

FIG. 1 shows in simplified form the mechanism of sealing against a rotating pipe as effected by ACD seal elements. A seal element 12 in an ACD 100 may be urged against the exterior surface of a drill pipe 10 by means known in the art such as application of hydraulic pressure or mechanical constriction. The seal element 12 may be made from elastomer or other flexible material that can have its shape changed to be urged into contact with the drill pipe 10. Depending on the force used to actuate the seal element 12, the seal element 12 contacts the drill pipe 10 with an actuation pressure denoted by $P_{actuation}$. "Drill pipe" is used herein to mean any rotating part of a string of drilling tools that will pass through the seal element 12. The differential pressure across the seal element 12, $\Delta P$ seal, is the difference between the pressure on one side 11 of the ACD and on the other side 13 of the ACD. Those skilled in the art will recognize that an annular opening 15 is defined within the interior of the seal element 12 when it is retracted away from the drill pipe 12 through which opening 15 the drill pipe 12 may freely pass.

The drill pipe 10 rotates inside the seal element 12 as shown at $DP_{rotation}$. The combination of differential pressure $\Delta P_{seal}$, rotation of the drill pipe 10 against the seal element 12 and actuation pressure $P_{actuation}$ contribute to seal element wear. Two factors that may be affected to increase seal life (wear resistance) include: increasing the wear resistant properties of the seal element 12 material, consistent with the requirement not to cause excessive wear on the drill pipe 10, to reduce differential pressure across the seal element (thus reducing the required actuation pressure); and reducing the contact between the surface of the drill pipe 10 and the seal element 12. It will be appreciated that the differential pressure $\Delta P_{seal}$ may be the difference between the fluid pressure inside a well below the ACD 100 and atmospheric pressure above the ACD 100. The ACD 100 is thus designed to handle differential pressure $\Delta P_{seal}$ of the maximum expected fluid pressure in the well.

Figure 2A:
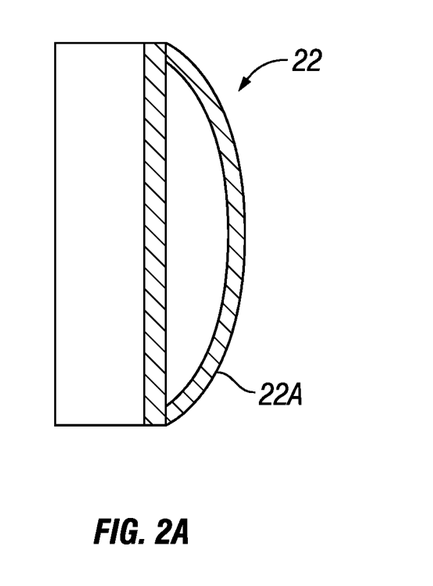
FIG. 2A shows an example embodiment of wear resistant material applied to the wear surface of a seal element.

FIG. 2A shows an example embodiment of a seal element 22 having one or more wear reducing material strips 22A applied to the inner (pipe contact) surface of the seal element 22. The wear resistant material strip(s) 22A may make contact with the drill pipe (10 in FIG. 1), thereby reducing contact between the seal element material (e.g., elastomer as explained above) and the drill pipe (10 in FIG. 1). Example material that may be used in some embodiments for the wear resistant material 22A comprises DELRIN brand synthetic resinous plastic. DELRIN is a registered trademark of du Pont Polymers, Inc., Wilmington, Delaware Another material that may be used is OKROT wear resistant material. OKROT is a registered trademark of Trelleborg Sealing Solutions Germany GmbH, Schockenriedstr. 1, 70565 Stuttgart, Germany. Other materials for the wear resistant material 22A may comprise soft metals such as aluminum. The wear resistant material 22A in the present example embodiment may extend over the entire inner surface of the seal element 22 as shown in FIG. 2A.

Figure 2B:
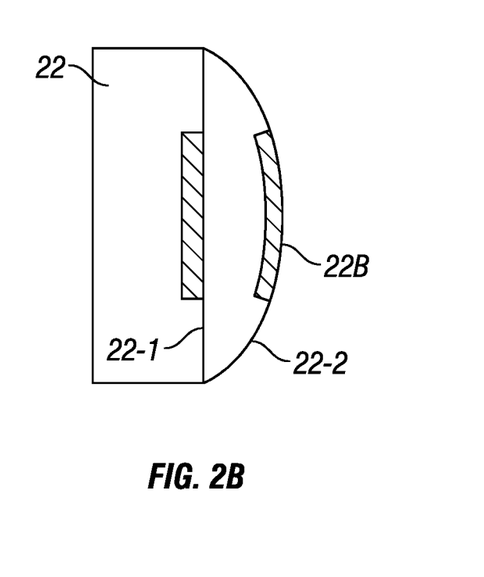
FIGS. 2B and 2C show example embodiments of a wear resistant material applied to the wear surface of a seal element.

In some embodiments as shown in FIG. 2B, the wear resistant material may be applied only to part 22B of the interior surface of the seal element 22. The part 22B may be chosen to be that portion of the seal element 22 expected to come into contact with the drill pipe (10 in FIG. 1) by reason of the change in shape of the seal element 22 effected by pressurizing its interior as shown in the "expanded" view 22-2. The unpressurized shape of the seal element 22 is shown at 22-1.

Figure 2C:
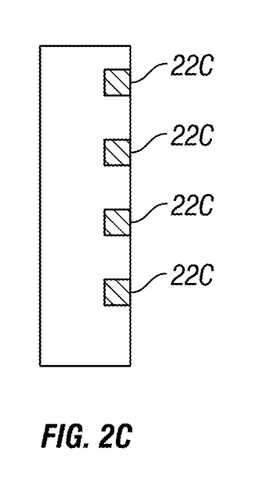

In some embodiments, the wear resistant material 22 may be in the form of "pucks", disks or annular rings as shown at 22C in FIG. 2C. Embodiments such as shown in FIGS. 2B and 2C may provide increased wear resistance to the seal element 22, while maintaining a higher degree of flexibility to the seal element 22 than may be the case when the entire interior surface of the seal element 22 is covered by the wear resistant material as shown as 22A in FIG. 2A.

Figure 3:
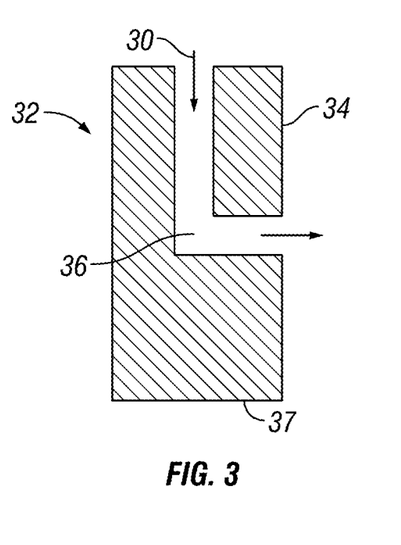
FIG. 3 shows an example embodiment of a seal element having a lubrication channel.
Figure 4:
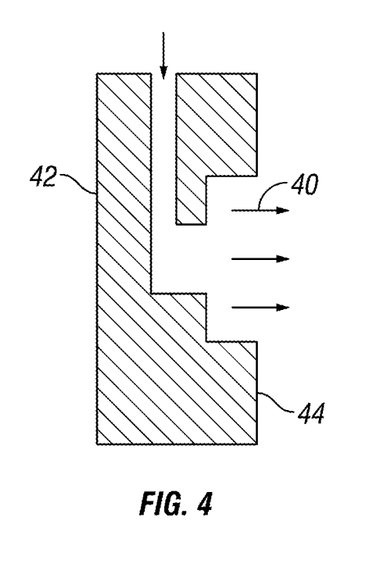
FIG. 4 shows another example embodiment of a seal having a lubrication channel having a larger contact area than the lubrication channel shown in FIG. 3.

FIG. 3 shows an example embodiment of a seal element 32 having a lubricant channel 36 extending between a lubricant source 30 and the wear surface 34 of the seal element 32. In some embodiments, the lubricant source 30 may be a lubricant reservoir filled with, e.g., oil or grease. In some embodiments, the lubricant source 30 may be drilling fluid (mud) applied at a selected pressure that balances pressure applied to the high pressure side 37 of the seal element 32. FIG. 4 shows a variation of the embodiment of FIG. 3, in which the seal element 42 comprises a larger lubricant contact area 40 formed in the wear surface 44 of the seal element 42. The larger area 40 may act as a fluid bearing. Fluid bearings are well known in the art, including arrangements to make such bearings self-centering.

Figure 5:
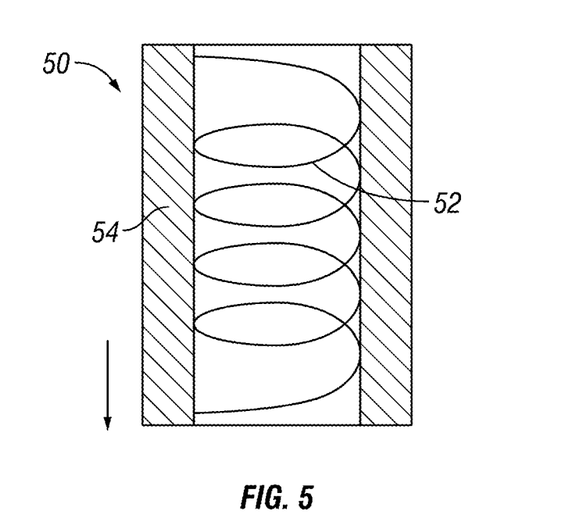
FIG. 5 shows an example embodiment of a lubrication groove on a seal surface of a seal element.

FIG. 5 shows an example embodiment of a seal element 50 in which a lubricant channel 52 has been formed in the wear surface 54 of the seal element 50. The lubricant channel 52 may be in the form of a groove shaped to urge drilling fluid (mud) to move through the channel as the drill pipe (10 in FIG. 1) moves within the seal element 50. The groove 52 may be, for example, helically shaped.

Figure 6:
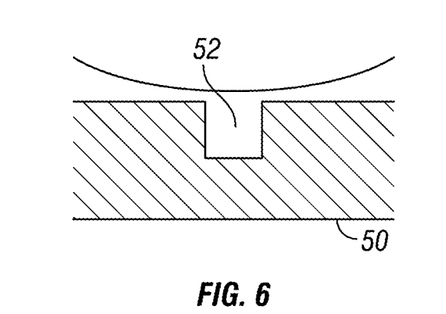
FIG. 6 shows an expanded view of the example embodiment of a lubrication groove shown in FIG. 5 to highlight contact between the seal element and drill pipe extended through the seal element.
Figure 7:
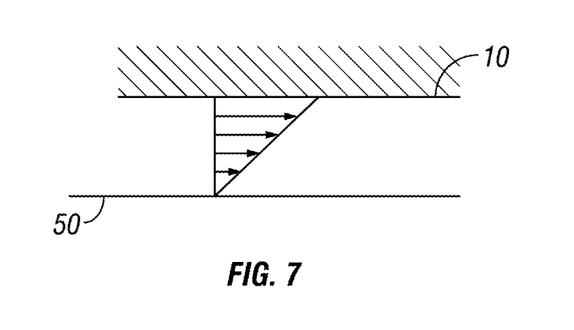
FIG. 7 shows graphically an explanation of the principle of operation of a lubrication groove.

FIG. 6 illustrates in larger scale what is shown in FIG. 5 with reference to the lubricant channel 52, and shows the area of contact between the drill pipe 10 and the channel/seal element 50. The principle of operation of the lubricant channel is illustrated in FIG. 7. As the drill pipe 10 rotates within the seal element 50, a properly shaped lubricant channel will cause drilling fluid to be moved ("dragged"). By suitable selection of the width of the lubricant channel 52 and pitch of a helically shaped lubricant channel, the amount of fluid flow through the lubricant channel 52 may be limited to an amount that can be removed efficiently using pumps or other fluid removal, while limiting the possibility of uncontrolled flow in the event fluid enters the well in the form of a "kick" (uncontrolled entry). By selecting the pitch direction of the helix the net flow direction can be chosen to match operational requirements (up or down).

Figure 8:
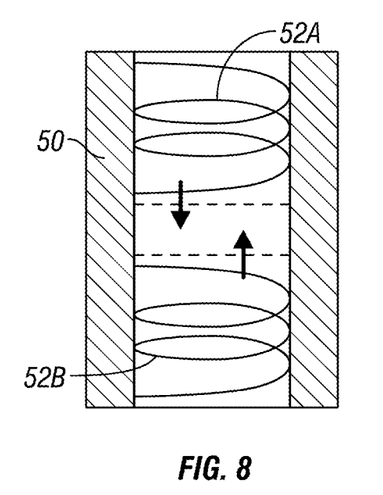
FIG. 8 shows another example embodiment of a lubrication groove having contra wound helical configuration to effect lubrication in both directions of rotation of the drill pipe.

FIG. 8 shows another example embodiment of a seal element 50 according to the principle of the embodiments shown in FIGS. 5 and 6. The embodiment of the seal element 50 in FIG. 8 may comprise two, opposed lay helical grooves 52A, 52B, whereby rotation of the drill pipe (10 in FIG. 1) within the seal element 50 tends to move drilling fluid toward the axial center of the seal element 50. This may provide the advantage of creating a high pressure area in the middle with very limited fluid leakage in either direction. Due to the high pressure the fluid will be forced between the drill pipe and the sealing material, thus reducing the wear on the seal material.

FIGS. 7A through 7D show graphically a method for optimizing arrangement of a lubrication groove with reference to fluid leakage and wear properties.

Figure 7A:
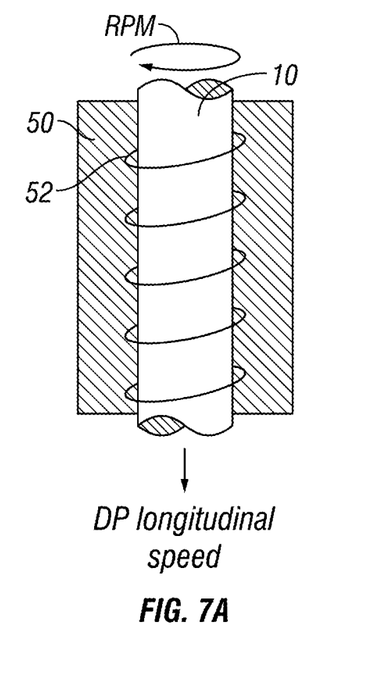
FIGS. 7A through 7D show graphically a method for optimizing arrangement of a lubrication groove with reference to fluid leakage and wear properties.
Figure 7B:
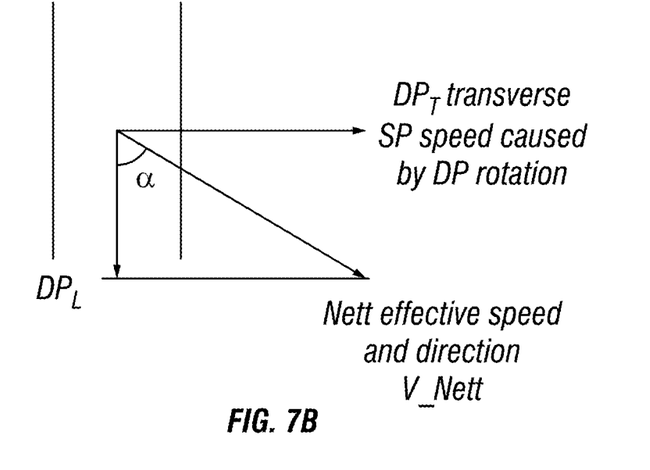

FIG. 7A shows the drill pipe 10 rotating within the actuated seal element 50. The effective speed of the drill pipe 10 in the longitudinal direction, shown as DPL is caused by moving the drill pipe in longitudinal direction. The effective speed DPL can be caused by the drilling rate of penetration which is usually low speed during drilling, and during tripping which is usually at high speed. Total net effective speed is the vector addition of DPL and RPM (drill pipe rotation rate) induced speed. The foregoing is shown graphically in FIG. 7B. The resulting transverse direction of the speed of the drill pipe, with the helical lubrication channel 52 as a reference is the difference of the angle of the net effective speed ($\alpha$) and the angle of the helix ($\beta$). Net effective speed (V_Nett) along the lubrication channel 52 is a function of the effective speed DPL and the rotary speed RPM of the drill pipe 10 and the angle of the helix lubrication channel 52 provided by V_HL=cos($\alpha-\beta$)*V_Nett. The transverse speed (perpendicular to the lubrication channel 52) is given by V_HT=Sin(Alpha-Beta)*V_Nett. The foregoing are illustrated in FIGS. 7EA and 7EB.

V_HT can be used to provide "lift" to minimize contact between the seal element (50 in FIG. 7A) and the drill pipe (10 in FIG. 7A).

Figure 7C:
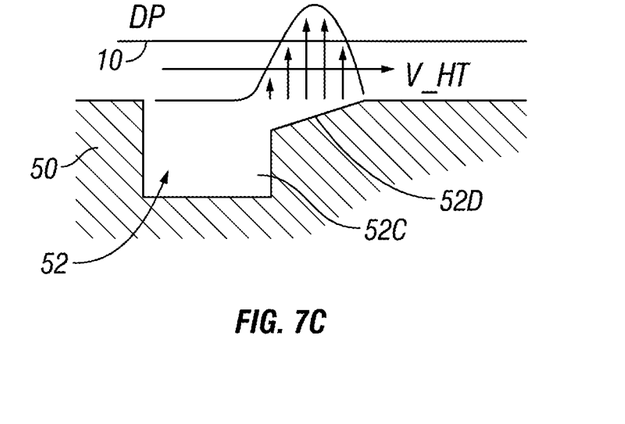

FIG. 7C shows an embodiment of the lubricant channel 52 designed to take advantage of the principle of fluid lift. By choosing an asymmetrical cross section for the lubrication channel 52, for example, a channel that comprises a main groove 52C with substantially square walls, and on one side a tapered wall 52D, the lifting capacity can be maximized. There is an optimal pitch angle with respect to expected drill pipe rotational speed and channel geometry which maximizes lift, while minimizing leakage.

Figure 7D:
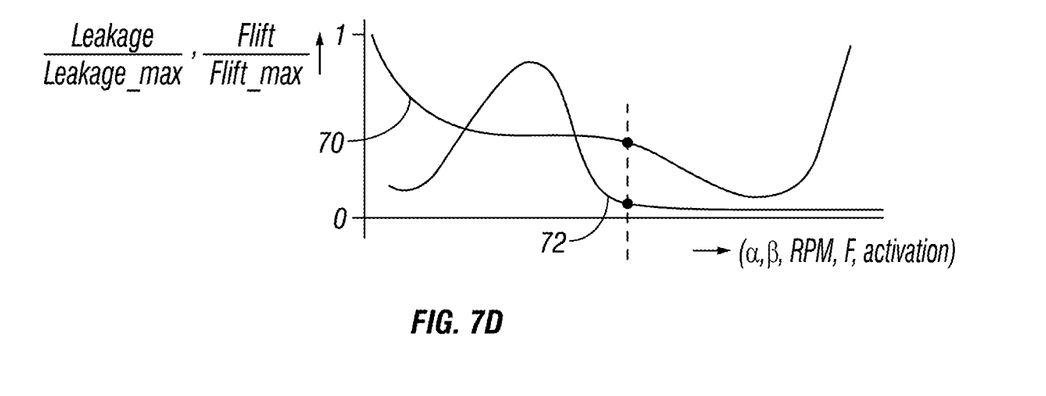

Determining the optimized pitch angle with reference to expected rotation speed is shown graphically in FIG. 7D. The vertical axis shows the values in a dimensionless way by dividing the actual value with the maximum value encountered. The fluid lift force, shown by curve 70, is related to fluid properties of the drilling fluid, the actuation force applied to the seal element (50 in FIG. 7A) and the drill pipe effective speed in the direction transverse to the axis of the seal element (50 in FIG. 7A), It may be observed that drill pipe effective speed in the transverse direction is a function of drill pipe diameter (and consequently effective linear speed of the pipe surface with respect to the seal surface) and the drill pipe RPM. Effective drill pipe speed in the axial direction is related to the drill pipe speed in the transverse direction and the lay angle (beta) of the lubricant channel (52 in FIG. 7A). The fluid leakage through the seal element (52 in FIG. 7A) is shown by curve 72. Optimal values for drill pipe transverse speed and lay angle of the lubricant channel are those which maximize the lift force and minimize the fluid leakage for chosen values of drill pipe RPM and drill pipe diameter. It is recognized that, although the graph is showing only a two dimensional graph, determining the optimal point is a multidimensional problem as depicted by the number of variables on the horizontal axis.

Figure 9:
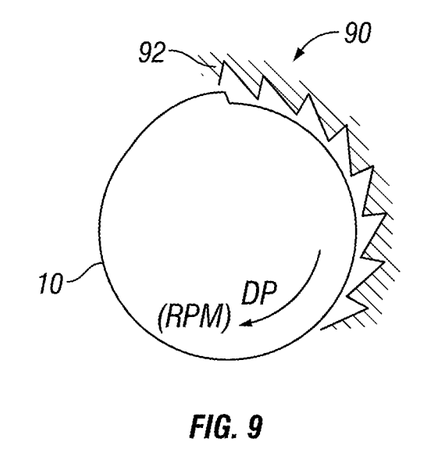
FIG. 9 shows an example embodiment of a fluid bearing used in connection with a seal element according to the present disclosure, FIG. 10 graphically illustrates the mechanism of a fluid bearing made according to FIG. 9.

FIG. 9 shows an example embodiment of a seal element 90 having a fluid bearing inner surface 92. The inner surface 92 may be generally sawtooth-shaped.

Figure 10:
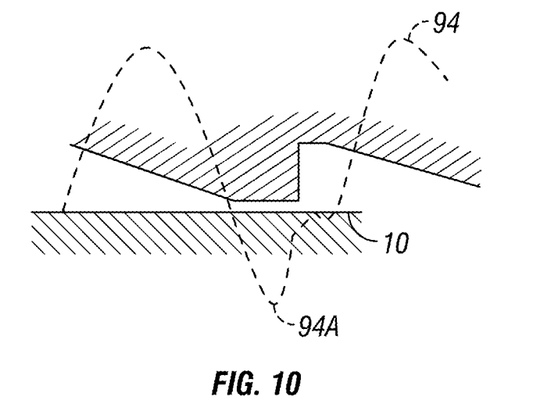

FIG. 10 shows a detailed view of part of the seal element shown in FIG. 9, and at 94, shows a seal pressure curve 94 with reference to the sawtooth shape of the inner surface. Because of the sawtooth shape of the inner surface, an effective negative pressure zone 94A may be created in the area where the inner surface is closest to the surface of the drill pipe 10. This negative pressure area can exists due to the fact of the higher surrounding pressures and needs to be avoided as much as possible. Such negative pressure may nullify the positive effects of the saw tooth shape pressure built 94 and could have the effect of the drill pipe touching the sealing material again. Proper design of the inner surface shape can minimize or remove this effect.

Figure 11:
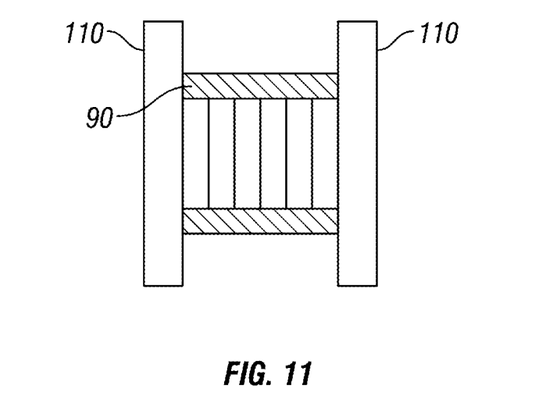
FIG. 11 shows an example embodiment of sealing elements used with a fluid bearing having contact sealing elements on both longitudinal ends of the seal element.

As illustrated in FIG. 11, addition of flat, disk shaped seal elements 90 on the upper and lower longitudinal ends of the seal element 110 may improve overall sealing. In some embodiments, the fluid bearing may be oriented at an oblique angle to the axis of the drill pipe to assist fluid pumping, as in the embodiments explained with reference to FIGS. 5 through 9.

Figure 12:
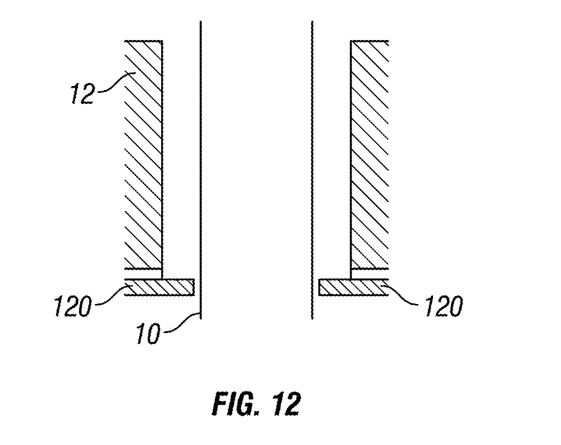
FIG. 12 shows an example embodiment of wiper elements used with a fluid seal according to the present disclosure.

FIG. 12 shows various embodiments such as explained above having a wiper seal 120 at one longitudinal end. Any of the seal elements explained above may be improved by the addition of the wiper seal on one longitudinal end of the seal element 12. The wiper seal 120 may be elastomer, metal mesh or other material maintained in close contact with the drill pipe 10 to exclude drill cuttings and other debris from entering the contact area between the drill pipe 10 and the seal element wear surface.

Figure 13:
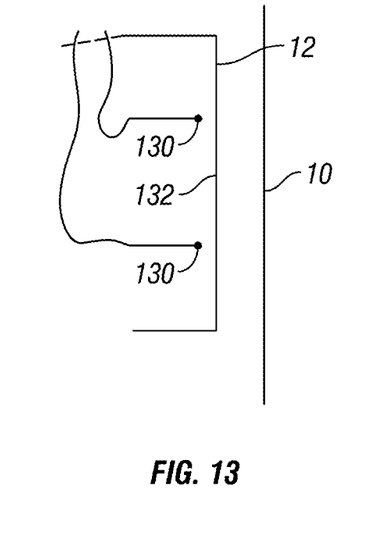
FIG. 13 shows temperature sensors included in some embodiments of a fluid seal element according to the present disclosure.

FIG. 13 shows an example embodiment of a seal element 12, which may be according to any of the embodiments explained herein, having sensors 130 embedded in the seal element 12 proximate the seal surface 132 at spaced apart locations. The sensors 130 could be of various types such as resistance sensors or temperature sensors. By monitoring seal temperature, impending seal failure may be warned in advance. Resistance sensors may wear at a rate corresponding to wear of the elastomers of the seal material so as to provide an indication of the amount of elastomer seal material removed using a relationship (which may be empirically determined) between resistance and wear of the elastomer seal material by comparing original resistance to actual resistance. Other sensor types could be used in some embodiments.

Figure 14:
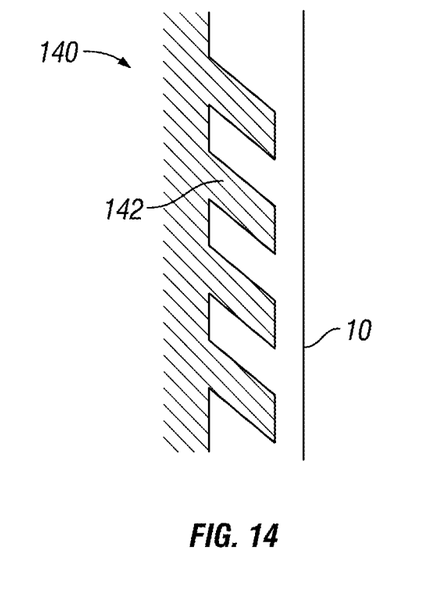
FIG. 14 shows an example embodiment of a labyrinth-type seal element according to the present disclosure.

In FIG. 14 shows another example embodiment, wherein the seal element 140 is formed so that it has a labyrinth seal surface 142. Such seal surface distributes the differential pressure applied to the seal element 140 across a plurality of seal surfaces between the drill pipe 10 and the seal element 140, thus reducing the required activation pressure. Reduced activation pressure may reduce wear rate for any particular material used as the seal element 140.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A seal element for an annular control device, comprising: an elastomer seal sleeve defining an annular opening therein between a pipe passing through the seal element when the seal element is uncompressed, the seal element arranged to be radially compressed to contact an exterior of the pipe;
  wherein the elastomer seal sleeve comprises at least one of a wear resistant material disposed on an interior surface of the seal sleeve or a lubricant channel formed on the interior surface; and
  wherein the elastomer seal sleeve comprises at least two, opposed lay helical grooves being continuous and longitudinally separated to as to traverse a circumference of the elastomer seal element a plurality of times to generate a high pressure area in the middle of the seal sleeve to reduce wear.

2. The seal element of claim 1 wherein the wear resistant material comprises longitudinally oriented wear bars.

3. The seal element of claim 1 wherein the wear resistant material comprises at least one circumferentially oriented wear ring.

4. The seal element of claim 1 wherein the lubricant channel comprises recesses forming a fluid bearing.

5. The seal element of claim 1 wherein the lubricant channel comprises an asymmetrical cross section.

6. The seal element of claim 5 comprising a taper on one side of the cross section.

7. The seal element of claim 1 further comprising a wiper seal disposed on at least one longitudinal end of the seal sleeve.

8. The seal element of claim 1 wherein the interior surface is shaped in the form of a labyrinth seal arranged to distribute a differential pressure across the seal element through a plurality of labyrinth chambers.

9. The seal element of claim 1 wherein the elastomer seal material comprises at least one sensor.

10. The seal element of claim 9 wherein the at least one sensor comprises a resistance sensor.

11. The seal element of claim 9 wherein the at least one sensor comprises a temperature sensor.

* * * * *